US009282290B2

(12) United States Patent
Shanks et al.

(10) Patent No.: US 9,282,290 B2
(45) Date of Patent: *Mar. 8, 2016

(54) MOSAIC CHANNEL VIDEO STREAM WITH INTERACTIVE SERVICES

(75) Inventors: David Eric Shanks, Los Angeles, CA (US); Matthew J. Thompson, Torrance, CA (US); Mark A. Shurgot, Los Angeles, CA (US); David E. Feldstein, Santa Monica, CA (US); Edgar C. Camacho, Torrance, CA (US); Craig Le, Temple City, CA (US); Ilan Tirer, Lomita, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/278,872

(22) Filed: Oct. 21, 2011

(65) Prior Publication Data

US 2012/0042342 A1 Feb. 16, 2012

Related U.S. Application Data

(63) Continuation of application No. 11/513,992, filed on Aug. 31, 2006, now Pat. No. 8,056,099.

(60) Provisional application No. 60/715,234, filed on Sep. 8, 2005.

(51) Int. Cl.
*H04N 21/482* (2011.01)
*H04N 7/16* (2011.01)
(Continued)

(52) U.S. Cl.
CPC ............... *H04N 7/163* (2013.01); *A63F 13/12* (2013.01); *H04N 5/44543* (2013.01); *H04N 5/44591* (2013.01); *H04N 21/439* (2013.01); *H04N 21/4312* (2013.01); *H04N 21/4314* (2013.01); *H04N 21/4316* (2013.01);
(Continued)

(58) Field of Classification Search
CPC .................................................. H04N 5/44543
USPC .......... 725/135, 10, 52, 38–46; 709/217, 226; 307/352, 260
See application file for complete search history.

(56) References Cited

U.S. PATENT DOCUMENTS 5,946,051 A 8/1999 Bril
6,002,394 A 12/1999 Schein et al.
(Continued)

OTHER PUBLICATIONS

Non-final Office action dated Mar. 21, 2012 in U.S. Appl. No. 12/098,747, filed Apr. 7, 2008 by David Eric Shanks et al.
(Continued)

*Primary Examiner* — Jefferey Harold
*Assistant Examiner* — Sihar Karwan

(57) ABSTRACT

An interactive mosaic channel video stream with indicators as to the action on a given video stream. The interactive mosaic channel is displayed on a video monitor, with a plurality of individual video feeds being presented at a given time, comprising a plurality of video cells presenting at least video information, each video cell associated with one of the plurality of individual video feeds, each video cell further comprising an area within the video cell reporting data related to the video feed, and a cursor, which can be moved between the plurality of video cells, for selecting at least one characteristic associated with a selected video cell, such that the user can then directly select a video program associated with the selected video cell.

21 Claims, 4 Drawing Sheets

(51) Int. Cl.
*A63F 13/30* (2014.01)
*H04N 5/445* (2011.01)
*H04N 21/431* (2011.01)
*H04N 21/439* (2011.01)
*H04N 21/443* (2011.01)
*H04N 21/478* (2011.01)
*H04N 21/488* (2011.01)

(52) U.S. Cl.
CPC ...... *H04N 21/4438* (2013.01); *H04N 21/4781* (2013.01); *H04N 21/482* (2013.01); *H04N 21/4886* (2013.01); *A63F 2300/409* (2013.01)

(56) References Cited

U.S. PATENT DOCUMENTS

| | | | |
|---|---|---|---|
| 6,154,771 A * | 11/2000 | Rangan | H04N 5/76 345/660 |
| 6,405,371 B1 * | 6/2002 | Oosterhout | H04N 5/44543 348/564 |
| 6,604,240 B2 | 8/2003 | Ellis et al. | |
| 6,802,077 B1 | 10/2004 | Schlarb | |
| 8,037,494 B2 | 10/2011 | Sie et al. | |
| 2002/0019981 A1 * | 2/2002 | Schein | G06F 3/0481 725/41 |
| 2002/0069419 A1 | 6/2002 | Raverdy et al. | |
| 2002/0166123 A1 | 11/2002 | Schrader et al. | |
| 2002/0170068 A1 | 11/2002 | Rafey et al. | |
| 2003/0079226 A1 | 4/2003 | Barrett | |
| 2003/0084441 A1 | 5/2003 | Hunt | |
| 2004/0255336 A1 | 12/2004 | Logan et al. | |
| 2005/0138656 A1 | 6/2005 | Moore et al. | |
| 2005/0198668 A1 | 9/2005 | Yuen et al. | |
| 2005/0232167 A1 | 10/2005 | Gilbert et al. | |
| 2006/0236342 A1 | 10/2006 | Kunkel et al. | |
| 2007/0124773 A1 | 5/2007 | Morris | |
| 2007/0157221 A1 | 7/2007 | Ou et al. | |
| 2007/0157248 A1 | 7/2007 | Ellis | |
| 2010/0077427 A1 | 3/2010 | Helms et al. | |
| 2010/0131983 A1 | 5/2010 | Shannon et al. | |
| 2010/0153999 A1 | 6/2010 | Yates | |
| 2012/0304066 A1 | 11/2012 | Brodersen et al. | |

OTHER PUBLICATIONS

Final Rejection dated Sep. 6, 2012 in U.S. Appl. No. 12/098,747, filed Apr. 7, 2008 by David E. Shanks et al.
Non-final Office action dated Sep. 10, 2013 in U.S. Appl. No. 12/098,747, filed Apr. 7, 2008 by David E. Shanks et al.
Final Rejection dated Mar. 18, 2014 in U.S. Appl. No. 12/098,747, filed Apr. 7, 2008 by David E. Shanks et al.
EPO Decision to refuse application dated Apr. 16, 2015 in European Patent Application No. 06802769.7 filed Aug. 31, 2006 by David E. Shanks et al.

* cited by examiner

MOSAIC CHANNEL VIDEO STREAM WITH INTERACTIVE SERVICES

BACKGROUND OF THE INVENTION

1. Field of the Invention

The present invention relates generally to satellite video systems, and in particular, to a method, apparatus, and article of manufacture for interactive mosaic channel video streams.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location.

Satellite uplink signals 116 are transmitted by one or more uplink facilities 118 to the satellites 102-104 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz. Future satellites will likely broadcast in the Ka-band of frequencies, i.e., 18-40 GHz, but typically 20-30 GHz.

As satellites 102-106 broadcast additional services and additional channels to viewers, viewers will like and expect to see programming on monitor 114 that relate to their specific needs and desires.

SUMMARY OF THE INVENTION

To minimize the limitations in the prior art, and to minimize other limitations that will become apparent upon reading and understanding the present specification, the present invention discloses an interactive mosaic channel video stream with indicators as to the action on a given video stream.

Such a channel is displayed on a video monitor, with a plurality of individual video feeds being presented at a given time, comprising a plurality of video cells presenting at least video information, each video cell associated with one of the plurality of individual video feeds, each video cell further comprising an area within the video cell reporting data related to the video feed, and a cursor, which can be moved between the plurality of video cells, for selecting at least one characteristic associated with a selected video cell, such that the user can then directly select a video program associated with the selected video cell.

Such a video channel optionally further comprises the user selecting a video program associated with the selected video cell, a secondary video cell is displayed, comprising at least the selected video program, and the secondary video cell further comprising displaying at least the data related to the video information in the video feed, the secondary video cell further comprising displaying data related to at least one other video feed.

The video channel can also comprise wherein the at least one characteristic associated with a selected video cell is the audio associated with that video cell, displaying statistics related to the video feed, allowing gambling on events occurring in the video feed, allowing a user to interact with the video feed using computer-generated figures, one of the video feeds being a selectable composite of other video feeds presented on the interactive matrixed channel, and one of the video feeds being a dynamic presentation of selected events on other video feeds.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
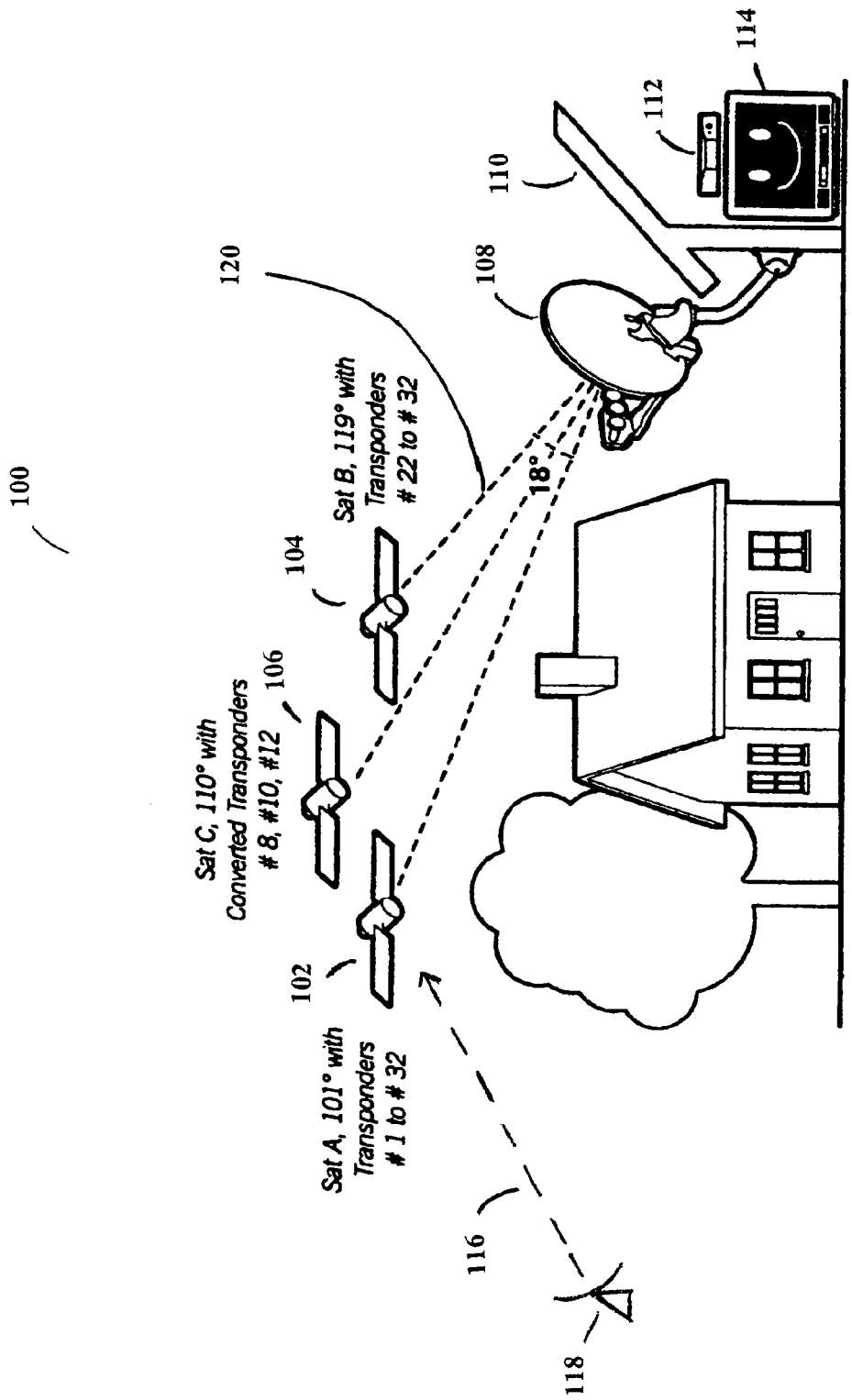
FIG. 1 illustrates a typical satellite television installation of the related art.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is an interactive television channel that allows a viewer to view a video stream and select specific audio and/or video from the video stream based on a viewer's individual desires. The video stream is typically delivered to a user's monitor 114 via system 100, but could be done using cable or other terrestrial techniques.

When a viewer watches a specific program on a monitor 114, they are watching a "viewer channel" that comprises video and audio information that is routed to a specific "channel" to the monitor 114. For example, when a viewer wants to watch the local FOX affiliate station, they know that station is associated with a specific channel number on their monitor 114 or IRD 112, e.g., channel 11. When they program or otherwise indicate to the monitor 114 or IRD 112 to tune to channel 11, the monitor 114 or IRD 112 manipulates the electronics to capture and present the video information associated with that command from the satellite downlink 120, or from another source such as a coaxial cable input (cable TV) or terrestrial broadcast frequencies to present that information on monitor 114. The "viewer channel" information is typically the information that is presented when a viewer selects a given "channel" on the monitor 114 or IRD 112.

The present invention provides additional viewer channels that comprise multiple video feeds that would normally be presented to a viewer on separate viewer channels, as well as optionally presenting indicators of what is happening on each video feed. A viewer channel that comprises multiple video feeds from other stand-alone channels is typically called a "mix channel."

The present invention also allows a viewer to select various portions of the video and audio presentation based on commands sent by the viewer, typically via the remote control, to select the desired video and audio that is presented. This presentation is typically referred to as an "interactive channel," an "interactive matrix channel," or an "interactive mosaic channel" herein.

Within the interactive mosaic channel, the viewer is given several choices of other viewer channels to view, either simultaneously as in a matrix view, or the viewer can choose one of the matrixed viewer channels directly from the interactive mosaic channel.

Further, other presentations of the mix channel can be presented even after a user has selected one of the video feeds to view directly.

There can be more than one interactive channel as described above, and, as such each of the interactive channels can have a thematic core, genre, or subject. For example, the interactive channels can comprise a group of related channels, such as a group of viewer channels that provide news programming, a second group of viewer channels that provide sports programming, a group of channels that provide children's programming, a group of channels that provide home shopping programming, or a group of channels that is selected by the user. Other groupings can be presented, such as all of the local network affiliate channels, specialty groups such as a group of channels that provide foreign-language specific programming, pay-per-view preview channels, sports programming, etc. The present invention is not limited based on the grouping of channels matrixed together to comprise the interactive mosaic channel.

The interactive mosaic channel can be reached in a similar fashion to the other viewer channels available for viewing on monitor 114; the interactive mosaic channel can be selected from the programming guide, the interactive mosaic channel number can be entered directly on the remote control, or the interactive mosaic channel would be found when the user is "channel surfing" or using the "next higher or lower channel" button on the remote control or directly on the monitor 114 or IRD 112.

Interactive Mosaic Channel Display Diagram

Figure 2:
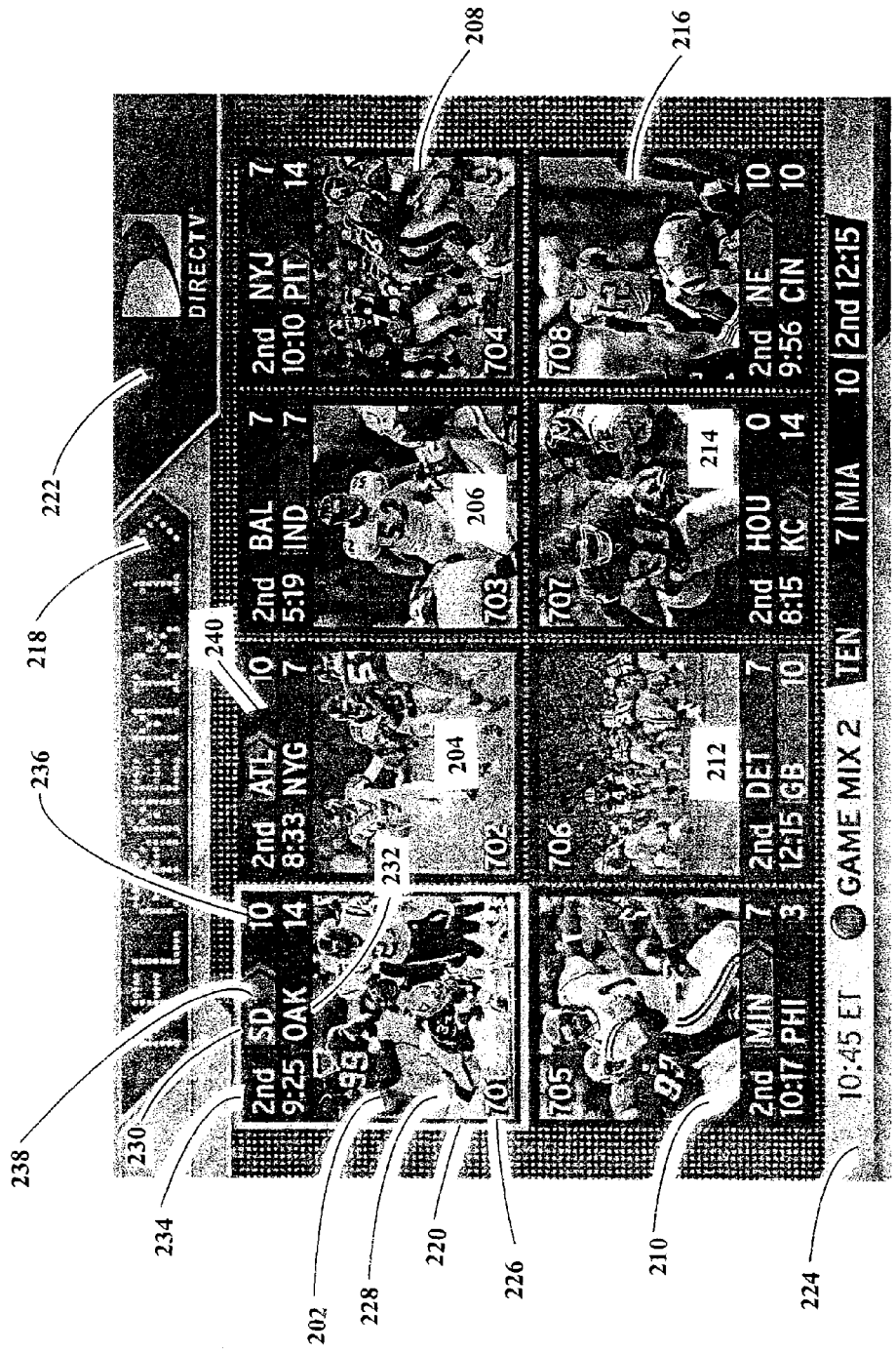
FIG. 2 illustrates a typical eight-cell matrix with a generic video feed in accordance with the present invention.

FIG. 2 illustrates a typical eight-cell matrix with a generic video feed in accordance with the present invention.

Interactive mosaic channel 200 is shown as being displayed on monitor 114. Within interactive mosaic channel 200, there are a number of video cells 202-216 and a text box 218, also referred to as an On Screen Display (OSD) 218. Optionally, the interactive mosaic channel 200 further comprises a cursor 220, a background video graphic 222, and a dynamic ticker 224.

The number of video cells 202-216 can change based on the number of video cells 202-216 desired. As the number of video cells 202-216 increases, of course, there must be a reduction in the size of the video cells 202-216 to ensure that the video cells 202-216 can be differentiated on the monitor 114. As the number of video cells 202-216 decreases, the size of the video cells 202-216 can increase, since there is more space available on monitor 114 to display video cells 202-216.

Further, the placement of video cells 202-216, text box 218, background graphic 222, and ticker 224 is not limited to the positions on monitor 114 as shown in FIG. 2. These elements 202-216, 218, 222, and 224 can be displayed anywhere on monitor 114 without departing from the scope of the present invention.

As there are multiple video feeds, e.g., one video feed for each video cell 202-216 being presented, each video cell 202-216, as well as text box 218, background video 222 and possibly dynamic ticker 224, have associated audio portions that can be played. Presenting more than one audio stream may be confusing to a viewer of monitor 114; as such, it is typical that only one audio stream of information is presented at a given time. Further, each of the video feeds may also have closed-captioning information associated with it, and selection of a closed-captioned presentation, rather than an audio presentation, can be performed if desired.

Video Cells

Video cells 202-216 each typically contain a separate viewer channel of programming. Further, each video cell 202-216 contains other information that is presented within the video cell as described herein.

Channel indicator 226 is shown within video cell 202, to show the viewer the "direct tune" channel number for that video cell 202. For example, video cell 202 shown in FIG. 2 shows a channel indicator 226 displaying channel 701 as the channel for that video information. When cursor 220 is placed on (or around) that video cell 202, as is shown in FIG. 2, the audio or other associated data for that video cell 202 can be presented to the viewer.

Related Data

There also may be other related data for a given video cell 202-216 that is of interest to a viewer. For example, as shown in video cell 202, the video feed 228 content is a National Football League™ game. Team identifiers 230-232 indicate that the game in video feed 228 is a contest between the San Diego Chargers and the Oakland Raiders. There is a clock indicator 234 that indicates that this game is in the second quarter, and that there are nine minutes and 25 seconds remaining in the second quarter. When certain events occur, e.g., a game enters the final two minutes of a period or half, the clock indicator 234 can change colors to further indicate to a viewer that the end of a period is coming up. This may be important for certain types of events, and not as important for others, but is available as a graphical display for the clock indicator 234 within the scope of the present invention.

Further, there is a current score 236, showing that Oakland is winning the game, 14-10. There is also a "possession" indicator 238, which is shown as a different color or other graphical indicator that shows that San Diego is currently in possession of the ball. For example, the light blue color of the possession indicator 238 indicates that San Diego is in possession of the ball.

Further, the possession indicator 238 can have a different size, position, or other graphical indicator to show the field position of the team in possession. For example, San Diego's possession indicator 238 shows that San Diego is currently at approximately midfield, because the possession indicator 238 in video cell 202 is approximately halfway across the possession indicator 238 graphics area. However, video cell 204, which is showing the Atlanta/New York Giants game, shows that Atlanta is currently on the Atlanta side of the field, since possession indicator 238 is of a different length and is less than halfway across the respective indicator 238 graphics area.

When certain game conditions occur, position indicator 238 may also change color as well as size. For example, when a team gets within twenty yards of the end zone on offense, they are considered in "the red zone" of the field. To indicate such a game condition, the position indicator 238 can turn red, which indicates to a viewer that a team is inside scoring range for either a touchdown or a field goal. When a team scores, the position indicator can flash or turn green, to indicate that the score of the game recently changed. Other indicators are possible, e.g., when a penalty is called, one or both of the position indicators 238 can turn yellow, when a turnover occurs, the recovering team's position indicators 238 can flash orange, etc.

For other types of video feeds, possession indicator 238 may provide other types of information. For example, in a hockey game, possession of the puck by a given team does not necessarily indicate an advantage in the game or an impending score. However, if one hockey team is on a power play, or has a two-person advantage, possession indicator 238 can indicate these condition by changing color, flashing, or other graphical indication to the viewer, such that the game condition is known by glancing at the mix channel 200 in an overview fashion, rather than paying attention to each video cell 202-216 in detail to determine the progress of each video feed. So, for example, if one hockey team is on a power play (one-person advantage), the possession indicator 238 may be green. If one hockey team has a two-person advantage, the possession indicator 238 may be red, or flashing green, to indicate a different game condition to the viewer.

The possession indicator 238, clock indicator 234, or team identifiers 230-232 can also change color, flash on and off, or present any number of visual clues to the viewer, to indicate what is going on within video cell 202. For example, as shown in video cell 206, Indianapolis is in possession of the ball and the possession indicator 238 is almost all the way over to the right, which means Indianapolis is threatening to score. The possession indicator 238 is colored red, and the background color of Baltimore's possession indicator 238 changes from a dark blue to a maroon. Further, in video cell 212, Green Bay's possession indicator 238 is bright green, indicating a recent score by Green Bay.

Placement of Video Cells

The placement for each video cell 202-216 can depend on a wide variety of factors, such as Nielsen ratings for a given channel, whether a given channel is available on a specific viewer's programming package, viewer channel number (lowest to highest or highest to lowest), expected ratings of the video feed, or can be decided or changed based on programming that is present on one or more of the viewer channels available for the interactive mosaic channel.

For example, and not by way of limitation, a game between two division rivals, such as New England and Miami, may have an expected viewer rating higher than a game between two teams that are not doing well in a given season. As such, the New England/Miami game may be placed in video cell 202 rather than in video cell 206, or vice versa. Further, as video cell 202-216 information becomes static, e.g., a game ends, or, conversely, as video cell 202-216 information becomes more important, e.g., a game goes into overtime, placement or movement of the video feeds for the video cells 202-216 can be changed.

Other information may also appear in video cell 202-216, such as an indication that the video feed that is being presented in the associated video cell 202 is a "user favorite" channel, the video cell 202-216 may be presented in a different color or video texture to indicate that the video feed that is being presented in the associated video cell 202 is a channel that presents programming that adults may wish to block from their children's view or has closed-captioning available, etc. Many possibilities are available within the scope of the present invention to present various types of video information within video cell 202-206 for viewer selection and benefit. Further, if the video feed for a given channel has not started yet, e.g., a game has not started yet, a graphic may be displayed to indicate the nature of the upcoming video feed for that video cell 202-216.

Text Box

Text box 218 contains textual information that is useful to the viewer, and this information can change depending on the viewer's selection of interactive services as described herein. For example, the text box 218 can contain a generic statement about the genre of the interactive mosaic channel 200, or statements directed to a selected video cell 202-216 or information related to a selected video cell 202-216 to describe to a user the meaning of the information presented in the video cell 202-216 or other information related to the video cell 202-216. The text box can also scroll to present additional information to the viewer that does not all fit within text box 218 at a given time.

There can also be default text associated with each interactive mosaic channel 200, and, depending on the capabilities of IRD 112, each time an interactive mosaic channel 200 is tuned to, a default descriptive text shall be displayed in the text box 218.

Background Video

Background video 222 is typically a backdrop for the interactive mosaic channel 200. The background video 222 can be related to the genre of the interactive mosaic channel 222; for example, in a news environment, the background video 208 can be related to a top news story, the stock market exchange building, a prominent government building, etc. The background video 222 can be changed or can be a dynamic video depending on the desires of the editorial staff or viewer preferences. Further, the background video 222 can be a logo or other indicator of the source of the interactive mosaic channel 200, such as DIRECTV.

Dynamic Ticker

The dynamic ticker 224 can be used to provide real-time updates to the genre of the interactive mosaic channel 200. For example, in a sports environment, the dynamic ticker 224 can provide updated scores or breaking news, or act as an alert system as described herein. The dynamic ticker 210 can also be used to present other information, such as statistics, closed captioning information, or other information, that can be related to the genre or to other issues. The dynamic ticker 224 can also be updated with new information at a different rate than that of the video cells 202-216, because the source of information that is used to create dynamic ticker 224 comes from a different source than the information that is presented in video cells 202-216.

Viewer Interaction

By selecting a given video cell 202-216, the viewer is selecting a specific characteristic associated with that given video cell 202-216, or associated video feed 228 used to generate that video cell 202-216. In most instances, when the viewer selects a given video cell 202-216 via cursor 220, the audio portion associated with the selected video cell 202-216 will be presented to the viewer, rather than a generic audio portion associated with interactive mosaic channel 200. Further, selection of a given video cell 202-216 with cursor 220 may also select a closed captioning data stream associated with the selected video cell 202-216, depending on the availability of such a data stream and/or other settings that a viewer has selected. Cursor 220 can be moved to any of the video cells 202-216, and, optionally, can be moved to select text box 218 or ticker 224.

When cursor 220 is moved to a given video cell 202-216, or to text box 218 or ticker 224, text box 218 also may undergo a change in information. Typically, when the video cell 202-216 is selected by the viewer, indicated by the presence of cursor 220, text box 218 will present the information in the Advanced Program Guide (APG) that is associated with the viewer channel (indicated by channel indicator 226) selected by cursor 220. The APG typically includes information on the program or "show" that is currently being presented by the viewer channel shown in video cell 202-216, as well as the time that show is being aired and the next show to be aired on that viewer channel. Other information, either in the APG or external to the APG, can also be displayed in the text box 218 when the cursor is moved to a given video cell 202-216. The text box 218 can also remain static if desired.

As such, the viewer can "interact" with the interactive mosaic channel 200 and decide which audio track to listen to, find out a plot line of each of the shows being presented in the various video cells 202-216, or find out what is going to be aired next in the various viewer channels being presented in video cells 202-216, while variously viewing the video presentations in the video cells 202. If a specific video cell 202-216 presents video information that is of interest to a viewer, then the viewer can move cursor 500, via a remote control command, to a given video cell 202.

If the viewer decides that the selected video cell 202 is of enough interest, the viewer can then directly tune to the selected video cell 202, i.e., tune directly to that viewer channel that is providing the video and audio used to create video cell 202, by pressing a single button on the remote control (typically the "select" button on a DIRECTV remote control). This will tune the IRD 112 or monitor 114 to that viewer channel, which will then be presented full-screen to the viewer as in a normal television monitor 114 viewing format.

Default Conditions

When a viewer arrives at a given interactive mosaic channel 200, the position of cursor 220 may default to the first video cell 202, any given video cell 202-216, or not be present at all. The viewer may have to press a button on the remote control to activate the cursor 220. Typically, a viewer moves the cursor 220 by using the up/down/left/right keys on a remote control associated with the IRD 112, but other methods can be used without departing from the scope of the present invention. Further, if IRD 112 is not enabled for any or enough interactive services, the cursor 220 functions may be disabled, either entirely or partially, depending on the capabilities of IRD 112.

There can also be the ability to record interactive mosaic channel 200 which will allow a viewer to record what would be several viewer channels as a single viewer channel, i.e., the recorded interactive mosaic channel 200. However, a recorded version of interactive mosaic channel 200 may act differently than a live-feed interactive mosaic channel 200, because the cursor 220 functions may no longer be consistent with a recorded version of that video information. For example, selection of a video cell 202, in a live-feed version, would tune the IRD 112 to the channel number associated with that video cell 202. When it is a recorded version, selection of that video cell would not tune the IRD 112 to the channel number, but would likely present that recorded video information in a full-monitor 114 format, with possible degradation of picture quality. The ability to record interactive mosaic channel 200 may also be selectively disabled if desired.

Changes in Interactive Mosaic Channel Display

Some of the interactive mosaic channels 200 may, because of the genre selected for that interactive mosaic channel 200 or for other reasons, may need to have the video cells 202-216 changed from one viewer channel to another, or to have video cells 202-216 added or deleted from the presentation of the interactive mosaic channel 200 on monitor 114. As such, there must be a capability to change the presentation of any given interactive mosaic channel 200. The changes may be of a time-sensitive nature, such as changes in news or sporting events, or a seasonal change, such as additional viewer channels carrying an event such as the NCAA Basketball Tournament, and thus, would be seasonally included in an interactive mosaic channel 200 presentation, or of a programming nature, where a viewer adds or deletes a viewer channel to their programming package and thus access to such a viewer channel is selectively allowed or denied. If such a viewer channel is being used to create a given interactive mosaic channel 200, then the interactive mosaic channel 200 must have the capability of adding that video feed for presentation on the monitor.

For example, in a sports genre interactive mosaic channel 200, it is typically known when a sporting event will start and which viewer channel the event will be carried on. So, interactive mosaic channel 200 can schedule the change to the video feed for that viewer channel as being shown on a video cell 202, or change away from a viewer channel that is no longer carrying a sporting event, based on a schedule or other set time-frame events.

When such changes take place, the service provider (which can be DIRECTV or some other service provider) can program the interactive mosaic channel 200 to change the video presentation on channel 200. This can be done in a variety of ways, either by selectively blacking out the video cells 202-216, presenting a graphic on the video feed during the changes made to the video cells 202-216, or other methods, presented to the viewer in such a way that the video feeds 228 used to create video cells 202-216 are not visible. It may or may not be desirable to present information on the dynamic ticker 210 that the viewer needs to wait during the change in programming. Once the interactive mosaic channel 200 programming is completed, the service provider would then send the video information that shows the new configuration of video cells 202-216, new text box 204 information, etc. Other methods of performing the change in video presentation of viewer channels are also possible within the scope of the present invention.

The service provider, and the viewer, have the ability to black out or disable viewer channels, and, as such, have the ability to black out or disable not only entire interactive mosaic channels 200, but the individual video feeds that are associated with video cells 202 that are presented within an interactive mosaic channel 200. Further, users may have the ability to create their own interactive mosaic channel 200, depending on the equipment capabilities of IRD 112, monitor 114, or other equipment that a specific viewer may have access to.

L-Wrap Presentation of Video Cell

Figure 3:
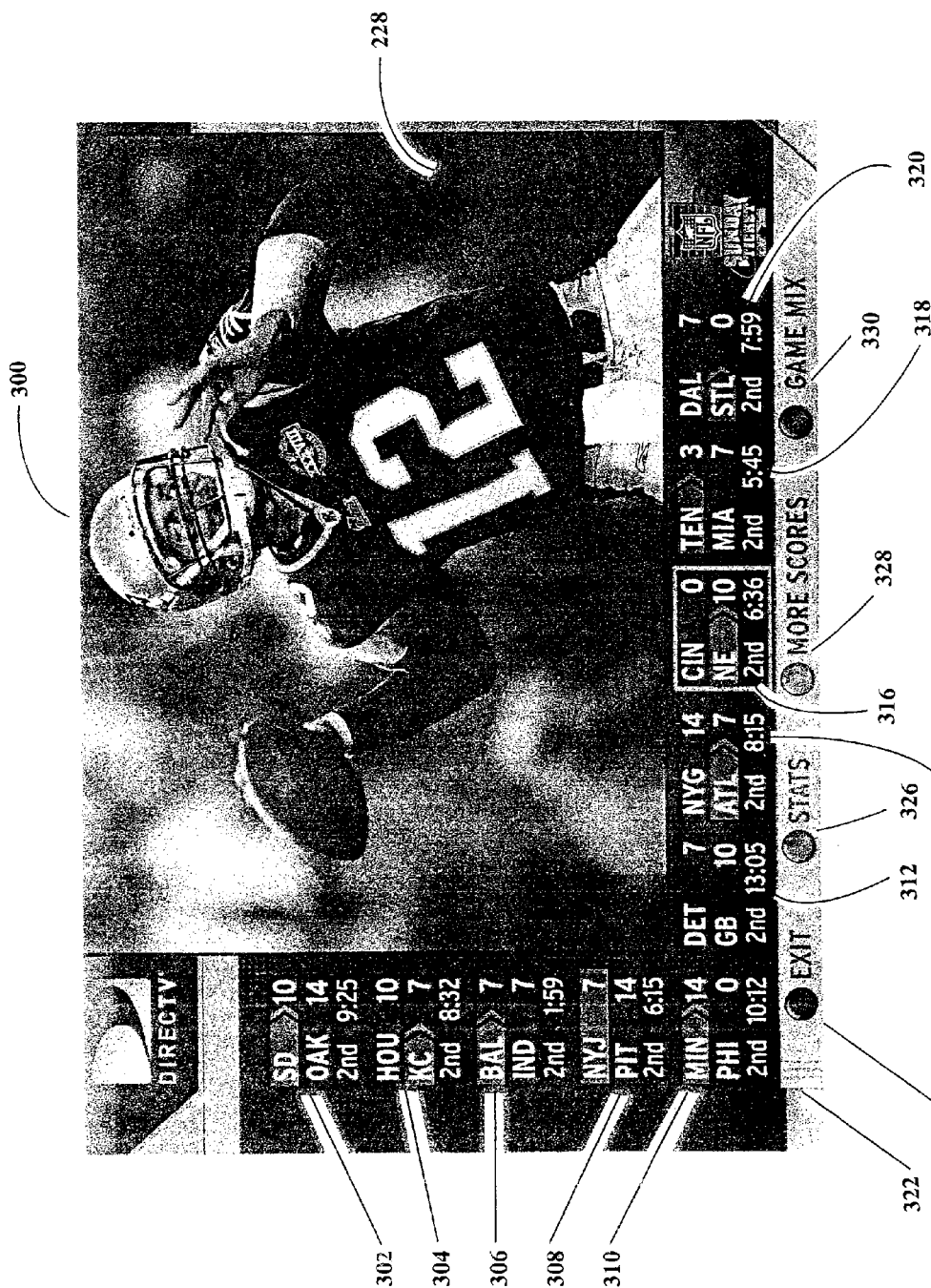
FIG. 3 illustrates a video presentation of one of the video cells of FIG. 2.

FIG. 3 illustrates a video presentation of one of the video cells of FIG. 2.

As discussed with respect to FIG. 2, cursor 220 can be placed on (around) any of the video cells 202-216 and, when desired, the viewer can push a button on the remote control for the IRD 112 and direct tune to the cursor 220 selected video cells 202-216. This typically brings the video feed for the selected video cell 202-216 to a "full screen" condition, but can also be shown in the format of FIG. 3.

Screen 300 displays the video feed 228 that was present in the cursor 220 selected video cells 202-216. However, the associated data with the other video cells 202-216, and other related video feeds that may or may not have been viewed on screen 200, are presented in an "L-wrap" format around screen 300. The clock indicator 234 current score 236, and possession indicator 238 for each game shown in data cells 302-320. Cursor 220 highlights which video feed is currently being viewed on screen 300. By moving cursor 220 from one data cell 302-320 to another, the screen 300 will change the video feed to show the selected video feed to the viewer on screen 300.

Further, the presentation comprises a taskbar 322, which comprises several selection buttons 324-330, described below.

Exit Button

The exit button 324, if selected by the viewer by pressing an indicated button on a remote control for IRD 112, will exit the "L-wrap" view and allow the user to view the selected video feed 228 on the full screen. Pressing the indicated remote control button again (once the video feed 228 was presented full screen) would return the view to the "L-wrap" view shown in FIG. 3. For example, the indicated remote control button for this exit button 324 function can be a red button.

Stats Button

The stats button 326, if selected by the viewer by pressing an indicated button on a remote control for IRD 112, will present statistics for the game selected by cursor 220. The statistics presented are shown on screen 300, either as an overlay to the video feed 228, or instead of video feed 228, to indicate team and/or individual statistics for the game selected by cursor 220. For example, the indicated remote control button for the stats button 326 function can be a green button. These statistics can be accessed via a computer and used to assist a viewer in assessing individual player statistics, team statistics, etc., for a variety of data compilations, including fantasy sports leagues, etc.

More Scores Button

The more scores button 328, if selected by the viewer by pressing an indicated button on a remote control for IRD 112, will shuffle the data in data cells 302-320 to give the user access to data that is not being presented in the original L-wrap presentation. For example, there may be additional games taking place, or additional games that have already been completed, that the viewer is interested in. Rather than change channels, the user can continue watching the video feed 228 on screen 300, and scroll through the other games in progress or games that have already been completed. For example, the indicated remote control button for the more scores button 324 function can be a yellow button.

Game Mix Button

The game mix button 326, if selected by the viewer by pressing an indicated button on a remote control for IRD 112, will return the viewer to screen 200 as illustrated in FIG. 2. For example, the indicated remote control button for this game mix button 324 function can be a blue button.

Alerts

If desired, when one of the data indicators reaches a certain condition, or another pre-determined event takes place, a pop-up message can appear on screen 300 to indicate to the viewer that something is happening on a video feed that the viewer is not currently viewing.

For example, with respect to FIG. 3, the viewer is watching the New England/Cincinnati game (as indicated by cursor 220). However, an event may occur in another game, such as a scoring play, a turnover, or a player that the viewer is interested in for fantasy football purposes has thrown a touchdown pass. When these events occur, an alert can be provided to the player, and, if desired, the player can press a button on the remote control to direct tune to that game or event, or to a special channel, e.g., a live highlights channel, that is showing the event in question.

Short Cuts

Further, each video feed 228 can be edited to remove unnecessary video information, e.g., huddles, time outs, etc., such that each video presentation can be viewed in a shortened amount of time. For example, every play of an average football game can be seen, without huddles, time outs, audibles, etc., in about 20-30 minutes of viewing time. Each video feed 228 used for the mix channel 200 can be compressed into this "short cuts" video package, and presented either on a separate "short cuts" video mix channel 200, such that a viewer can select which short cut video to view, or can be presented to a Personal Video Recorder (PVR), or can be presented on individual viewer channels, for viewing at a later time. The presentation of the short cuts mix channel 200, individual short cuts channels, or PVR service may require additional hardware or additional fees for a given viewer.

Highlights on Demand

Figure 4:
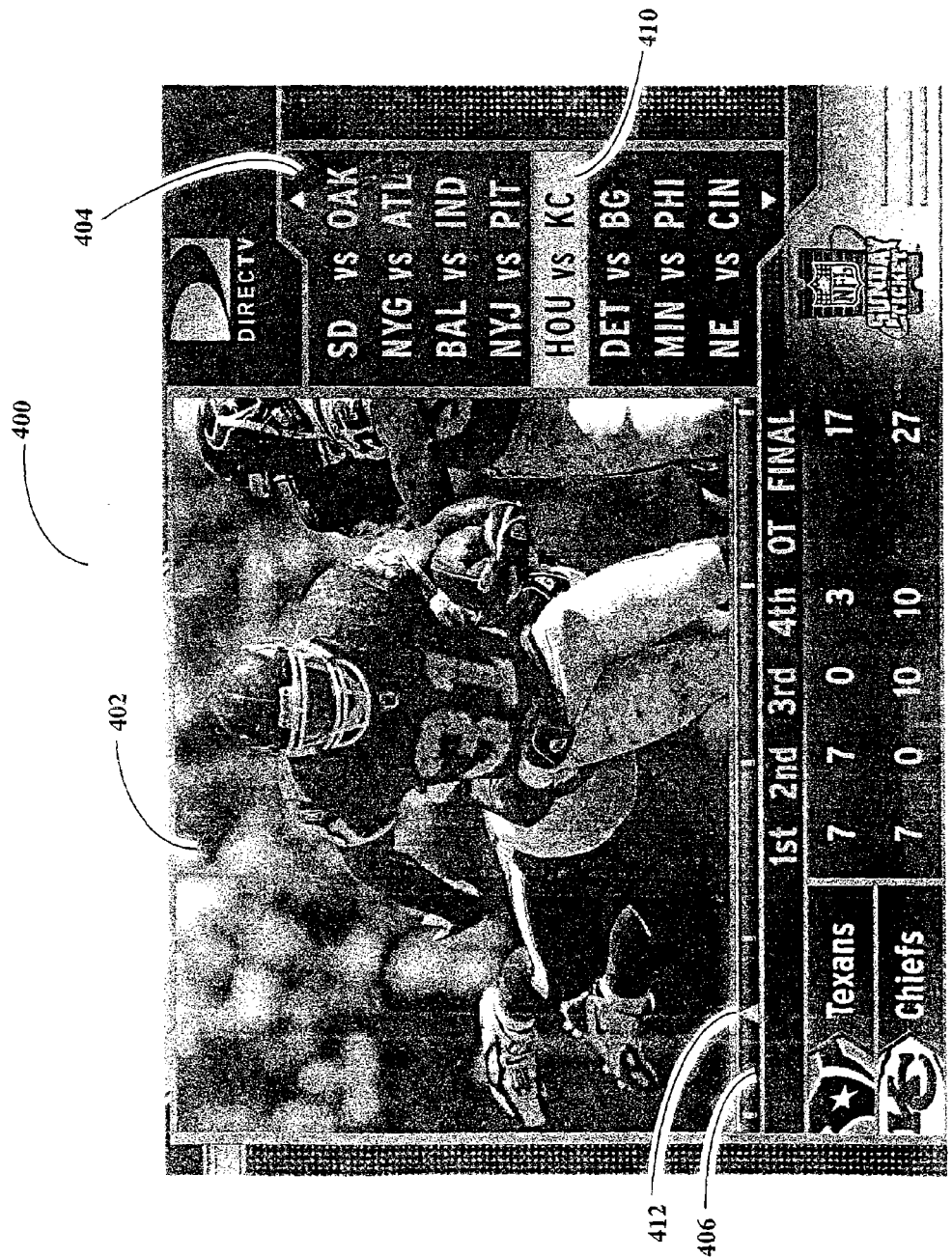
FIG. 4 illustrates a presentation of a highlights channel in accordance with the present invention.

FIG. 4 illustrates a presentation of a highlights channel in accordance with the present invention.

Screen 400 has several items shown, such as video 402, selection area 404, game ticker 406, and scoreboard 408. Screen 402 shows the video of highlights of a game selected in selection area 404. As shown in FIG. 4, selection area 404 has game 410 highlighted, which means that the Houston/Kansas City game is selected. Game ticker 406 indicates that the highlight being viewed on screen 402 is from the first quarter, because cursor 412 is in the first part of game ticker 406. Cursor 412 moves within game ticker 406 to indicate where in the actual game the video being shown in screen 402 takes place. Scoreboard 408 indicates the teams and which team scored in which period of the game, and the final score.

Live Highlights Channel

In addition to the highlights channel which shows highlights of individual games, screen 402, or another screen 300, or even one or more video cells 202-216, can be programmed to show highlights of events as they occur. Such a channel is called a "red zone" channel, and such a channel would switch back and forth between one event and another, showing exciting or important plays from various events that are occurring. Rather than watching the highlights when a broadcaster wishes to show them, such a "red zone" channel allows viewers to watch highlights when desired.

Interactive Gambling

The present invention allows for viewers to interactively place bets using their IRD 112 on contests where such bets are legally allowed. A viewer can place proposition bets, e.g., first score of the day, first penalty, etc., and obtain points or other remuneration for either gambling against others for money or for fun. A viewer can also obtain alerts related to fantasy football players, etc. for fantasy football leagues, fantasy baseball leagues, etc.

Interactive Gaming

The present invention also allows for viewers to participate in the game they are watching. For example, a player can use a video game that is designed or modified to interact with the video feed 228, such that the player is controlling one of the teams that are seen on the television monitor 114. For example, the offense in a football is controlled by the real players, while the defense is controlled via a joystick, controller, or other device that the viewer is using, such that a viewer can try to intercept a pass from a professional quarterback, hit a baseball pitch thrown by a professional baseball player, or drive a race car against professional race car drivers on the track at the same time the professional athlete is performing. Rather than using a computer to emulate the professional player, which is often done in sports video games, the viewer is playing against the actual player, in real time. Computer control of the outcome of the viewer's efforts may differ from the actual game, and the computer would record these differences and show a computer-generated different outcome than that of the real game. Statistics and scores from the hybridized computer-reality game would be recorded separately from those statistics from the actual game. The viewer can control whether to continue to view the actual game, the hybridized game, or the computer-generated game, depending on viewer preferences.

CONCLUSION

The present invention discloses an interactive mosaic video channel. Such a channel is displayed on a video monitor, with a plurality of individual video feeds being presented at a given time, comprising a plurality of video cells presenting at least video information, each video cell associated with one of the plurality of individual video feeds, each video cell further comprising an area within the video cell reporting data related to the video feed, and a cursor, which can be moved between the plurality of video cells, for selecting at least one characteristic associated with a selected video cell, such that the user can then directly select a video program associated with the selected video cell.

Such a video channel optionally further comprises the user selecting a video program associated with the selected video cell, a secondary video cell is displayed, comprising at least the selected video program, and the secondary video cell further comprising displaying at least the data related to the video information in the video feed, the secondary video cell further comprising displaying data related to at least one other video feed.

The video channel can also comprise wherein the at least one characteristic associated with a selected video cell is the audio associated with that video cell, displaying statistics related to the video feed, allowing gambling on events occurring in the video feed, allowing a user to interact with the video feed using computer-generated figures, one of the video feeds being a selectable composite of other video feeds presented on the interactive matrixed channel, and one of the video feeds being a dynamic presentation of selected events on other video feeds.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A system for transmitting matrixed video data on a single viewer channel, the matrixed video data comprising a plurality of individual video feeds for presentation in a plurality of video cells at a same time on a first screen, comprising:
a transmitter for transmitting the matrixed video data on the single viewer channel, wherein each of the plurality of video cells further comprises:
an area within the associated video cell reporting non-textual data relating to a current content of the video feed of the associated video cell, the non-textual data being separate from program guide data;
wherein when at least one of the plurality of video cells is selected via an interactive element, a second screen having secondary matrixed video data is displayed, the secondary matrixed video data excluding the video feeds of the unselected plurality of video cells and comprising:
a further video cell comprising the video feed associated with the selected video cell, the further video cell larger than the selected video cell;
a presentation of the non-textual data associated with at least one of the unselected plurality of video cells; and
wherein the interactive element is further movable to select the non-textual data associated with one of the unselected plurality of video cells to present the video feed associated with the selected non-textual data within the further video cell.

2. The system of claim 1, wherein the secondary video data further comprises at least non-textual data relating to a current content of the video feed associated with the selected one of the plurality of video cells.

3. The system of claim 1, wherein the secondary video data further comprises non-textual data relating to a current content of all of the unselected video cells.

4. The system of claim 1, wherein the selection of the one of the plurality of video cells further presents the audio associated with the selected video cell.

5. The system of claim 1, wherein at least one of the plurality of video feeds is a selectable composite of other video feeds included in the matrixed video data.

6. The system of claim 1, wherein the transmitter transmits the matrixed video data via at least one satellite.

7. A system for receiving matrixed video data on a single viewer channel, comprising:
a receiver, for receiving at least the matrixed video data, and for providing the matrixed video data for display, wherein the matrixed video data comprises:
a plurality of individual video feeds for presentation in a plurality of video cells at a same time on a first screen, wherein each of the plurality of video cells further comprises:
an area reporting non-textual data related to a current content of the video feed of that video cell, the non-textual data being separate from program guide data;
wherein when at least one of the plurality of video cells is selected via an interactive element, a second screen, having secondary video data is displayed, the secondary video data comprising:
a further video cell, comprising the video feed associated with the selected video cell the further video cell larger than the selected video cell;
a presentation of the non-textual data associated with at least one of the unselected plurality of video cells; and
wherein the interactive element is further movable to select the non-textual data associated with the unselected plurality of video cells to present the video feed associated with the selected non-textual data within the further video cell.

8. The system of claim 7, wherein the matrixed video data is transmitted to the receiver via at least one satellite.

9. The system of claim 7, wherein the secondary video data further comprises non-textual data relating to a current content of all of the unselected video cells.

10. A method for displaying matrixed video data, comprising:

receiving the matrixed video data from a transmitter on a single viewer channel, the matrixed video data comprising a plurality of individual video feeds presented in a plurality of video cells on a first screen at a same time;

providing non-textual data in an area of each of the plurality of video cells, the non-textual data related to a current content of the video feed of the associated video cell, the non-textual data being separate from program guide data, accepting a selection of one of the plurality of video cells according to an interactive element, and providing, when the video cell is selected, a second screen having secondary matrixed video data, the secondary matrixed video data comprising:
- a further video cell comprising the video feed associated with the selected video cell, the further video cell larger than the selected video cell; and
- a presentation of the non-textual data associated with at least one of the unselected plurality of video cells;
- wherein the interactive element is further movable to select the non-textual data associated with the unselected plurality of video cells to present the video feed associated with the selected non-textual data within the further video cell.

11. The method of claim 10, wherein the secondary video data further comprises non-textual data related to a current content of all of the unselected video cells.

12. The method of claim 10, wherein at least one of the plurality of video feeds is a selectable composite of other video feeds included in the matrixed video data.

13. The method of claim 10, wherein at least one of the video feeds is a presentation of selected events on the other of the plurality of video feeds.

14. The method of claim 10, further comprising allowing gambling on events depicted in at least one of the video feeds.

15. The method of claim 10, wherein the matrixed video data is transmitted to the receiver via at least one satellite.

16. The system of claim 1, wherein the current content of each of the plurality of video feeds depicts an associated athletic contest, and the non-textual data related to the current content comprises a graphic describing an aspect of the associated athletic contest.

17. The system of claim 16, wherein the athletic contest is a football game and the graphic describes possession and field position.

18. The system of claim 7, wherein the current content of each of the plurality of video feeds depicts an associated athletic contest, and the non-textual data related to the current content comprises a graphic describing an aspect of the associated athletic contest.

19. The system of claim 18, wherein the athletic contest is a football game and the graphic describes possession and field position.

20. The method of claim 10, wherein the current content of each of the plurality of video feeds depicts an associated athletic contest, and the non-textual data related to the current content comprises a graphic describing an aspect of the associated athletic contest.

21. The method of claim 20, wherein the athletic contest is a football game and the graphic describes possession and field position.

* * * * *